Jan. 16, 1951     S. B. PICKLES     2,538,035
ABSORBING SCREEN FOR DIRECTIVE RADIATION
Filed April 3, 1948

INVENTOR.
SIDNEY B. PICKLES
BY
ATTORNEY

Patented Jan. 16, 1951

2,538,035

UNITED STATES PATENT OFFICE 2,538,035

ABSORBING SCREEN FOR DIRECTIVE RADIATION

Sidney B. Pickles, North White Plains, N. Y., assignor to International Standard Electric Corporation, New York, N. Y., a corporation of Delaware Application April 3, 1948, Serial No. 18,753

13 Claims. (Cl. 343—108)

This invention relates to electromagnetic radiation systems and more particularly it relates to improved wave absorption screens for use in such systems.

In the provision of radio beacons distortion of the radiation field by reflecting objects may cause faulty course lines for the guidance of craft. Various methods have been devised to reduce the effect of reflections, as by shaping the antennas to reduce radiation toward reflecting objects and the like. Reflecting screens for this purpose have to be carefully designed for each installation to make the desired correction and to avoid introduction of other effects. As these devices generally change the shape of the radiation pattern they may also upset precalculated performance of the beacon.

A principal object of the invention is to provide an improved electromagnetic wave absorption screen which can be mounted adjacent an antenna without substantially changing the useful radiation pattern of the antenna, and while screening adjacent objects against undesired reradiation.

Another object is to provide an improved radiation absorption screen which is particularly well-suited for use in systems for guiding aircraft or the like by means of directionalized radiation patterns, such as glide path radiations and the like.

A feature of the invention resides in an electromagnetic wave radiation screen in the form of a multi-plane array of special absorption wires, preferably in the configuration of a wedge consisting of a series of spaced planes.

A further feature relates to an electromagnetic wave absorption screen comprised of a series of spaced parallel wires arranged in spaced planes with the wires of successive planes increasing in number and staggered so as to absorb substantially entirely radiation which is incident on the screen, while reducing to a minimum the reradiation effects of the screen as a whole.

The above-mentioned and other features and objects of this invention and the manner of attaining them will become more apparent and the invention itself will be best understood, by reference to the following description of an embodiment of the invention taken in conjunction with the accompanying drawings, wherein.

In certain fields of application of electromagnetic waves, it is desirable to use a device which is capable of being mounted adjacent a wave antenna to act as a screen between the antenna and one or more objects from which reradiation is to be avoided. At the same time, it is necessary that the screen itself act to a negligible extent as a reradiator, so that the desired or useful radiation pattern of the antenna is not materially changed either by said objects or by said screen. One particular application where such a screen is of great utility is in the guiding of aircraft by the well-known equi-signal glide path, produced by upper and lower antennas which set up upper and lower radiation patterns to define the glide path. The shape of this glide path depends upon the ratio of the upper antenna radiation pattern to that of the lower antenna radiation pattern. In order that the glide path be a straight line to the ground, it is known that the ratio of these pattern amplitudes should vary in accordance with a certain mathematical law. If any reflecting objects in the vicinity of the two antennas distort either or both of these patterns by a reradiation, the glide path will have so-called "bumps" in it, or other undesirable characteristics.

In the case of localizer antennas, screens and other artifices have heretofore been used to prevent reflecting objects from interfering with the signals on the localizer course. Such screens are usually of large dimensions and are not necessarily suitable for installations immediately adjacent to runways. Furthermore, the localizer antennas are installed nearer to the ground than is true of the upper antennas of the glide path, permitting the use of a smaller screen than is possible with the glide path antenna. It would be a very difficult problem, both mechanically and electrically, to associate these prior screens or reflectors with the upper antenna of the glide path, without interfering with the desired on-path signals, or without creating undesirable hazards to aircraft. It has become necessary, therefore, to devise some other means to prevent reflecting objects from interfering with on-course glide path signals.

This object is accomplished in accordance with the invention, by providing a novel construction of radiation absorbing screen for the upper antenna of a glide path system. It has been found that this screen does not reflect more than a very small fraction of any radiation which impinges upon it from a forward direction. This characteristic prevents any interference with the desired radiation patterns over the usable portion of the glide path radiation. Furthermore, the absorbing characteristics of the screen according to the invention, prevent signals from impinging upon a reflecting object, when such a screen is located between the upper glide path antenna and such reflecting object.

Figure 1:
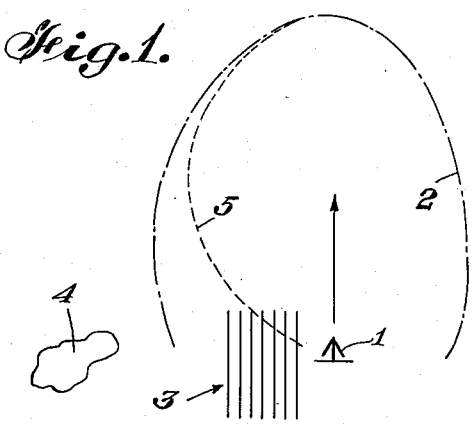
Fig. 1 is a top-plan view of a wave radiation system embodying the invention.
Figure 3:
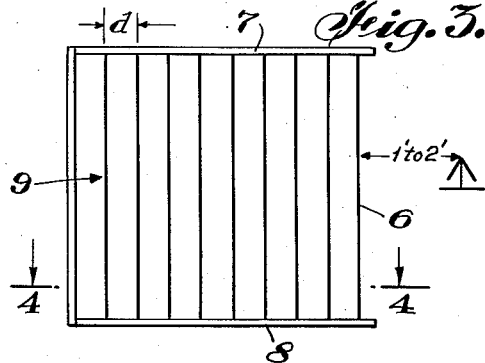
Fig. 3 is an enlarged top-plan view of the screen of Fig. 1.
Figure 2:
Fig. 2 is a front view of Fig. 1.
Figure 4:
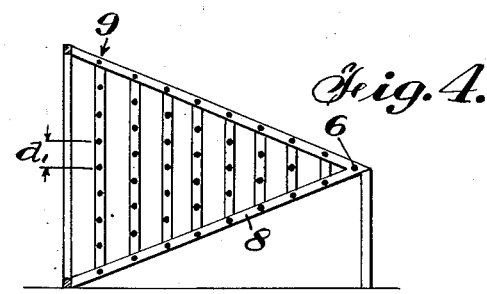
Fig. 4 is a cross-section of Fig. 3 taken along the line 4—4 thereof and viewed in the direction of the arrows.
Figure 5:
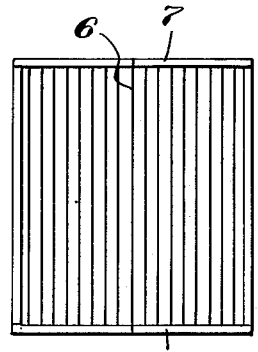
Fig. 5 is a right side view of Fig. 3.

Referring to Fig. 1, the numeral 1 represents any well-known form of radiation antenna such as is customarily employed as the upper antenna to set up glide path radiation patterns. The dot-dash line 2 represents the desired radiation pattern which is to be preserved to as great an extent as possible. Located adjacent the antenna 1, is the screen 3, according to the invention. The numeral 4 represents any object in the vicinity of the antenna 1, which is to be screened against reradiation, which reradiation would ordinarily take place as a result of the radiation from the antenna 1 impinging thereon. When the screen 3 is designed and located as described hereinbelow, there is very little change in the radiation pattern 2, this change being represented by the dotted line 5. In accordance with the invention, the screen 3 consists of a bank or array of small diameter resistance wires 6 arranged in a particular sequence or order. In general, the screen 3 has a wedge-shaped conformation as indicated in Fig. 2. The wires 6 can be of a resistance material such as "Nichrome" and supported in parallel spaced relation by being strung between the members 7, 8, of a light wooden frame illustrated in Figs. 3, 4 and 5. As shown more clearly in Fig. 4, the front or apex of the screen consists of a single wire 6. The remaining wires are located in successive parallel planes which planes are spaced apart a predetermined distance preferably one-quarter of the operating wave length of the antenna 1. It will be observed that each successive plane of wires has one more wire than the preceding plane and the wires in each plane are spaced apart a predetermined distance which however is not critical but is preferably less than one-half the operating wave length of the antenna 1. Likewise, the wires in each plane are staggered with relation to the wires in the adjacent planes. Thus, in one particular setup that was found to be satisfactory, each of the wires 6 has a physical length of 96 inches, the spacing $d$ between successive planes was 9 inches, and the spacing "$d_1$" between adjacent wires in each plane was approximately 4 inches, the antenna 1 operating at a frequency of approximately 330 megacycles per second. While the location of the antenna 1 with respect to the screen 3 is not critical, preferably it should be located at the middle region of the screen and spaced therefrom a distance of approximately 1 to 2 feet as indicated in Figs. 3 and 4.

The single wire 6 at the apex or front of the screen, when struck by a wave from antenna 1, reflects a small amount of energy; it also absorbs a small amount of energy, and transmits the remainder in the general direction towards the rear of the screen. The reflected energy builds up a small standing wave in front of the single wire 6. However, this wave has a very high decrement because this single wire acts as a new source of radiation. The energy impinging upon the two wires in the plane next succeeding the single wire 6, reflects somewhat more energy as compared to the reflection from the single wire 6. However, these two wires absorb somewhat more energy and transmit less in proportion. They are spaced from the first or single wire 6 a distance such that the reflected wave tends to over cancel the reflected wave from the single wire 6. Thus, the first three wires consisting of the single wire 6 and the next two coplanar wires, in combination, have a resultant reflected wave which is smaller than either the single wire 6 taken separately, or the next two coplanar wires taken separately. The next coplanar set of wires consisting of three, will in turn reflect a still greater percentage of the incident wave, absorbing still more energy and transmitting even less. These three coplanar wires are so spaced with respect to the preceding two coplanar wires as to tend to cancel the standing waves produced by the said two coplanar wires immediately in front thereof. This action still further reduces the resultant standing wave in front of the single wire 6.

It should be noted that each reflection which occurs beyond the first absorbing wire 6 suffers additional absorption as it progresses back towards its original source whenever it tends to pass sets of wires through which it was formally transmitted. The rear section 9 of the screen consisting of a large number of coplanar wires would by itself, reflect a very substantial portion of the wave energy incident thereon if it were not for the successive wires in front thereof. In other words, if the screen consisted only of one of these large sets of wires, the desired result would not be obtained, since the wave reflected from the screen would very appreciably disturb the radiation pattern of the glide path antenna 1 over the usable portion of the glide path.

Figure 6:
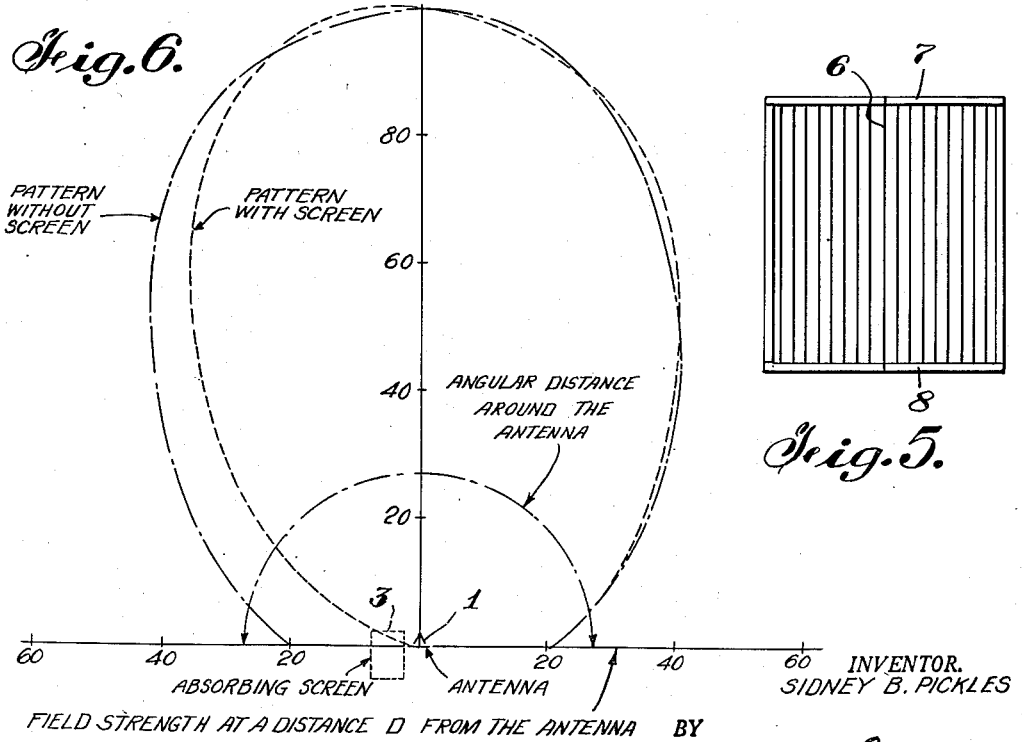
Fig. 6 is a graph explanatory of the invention.

Since the screen 3, when correctly oriented, does not reflect energy incident thereon from the antenna 1, it may be placed in the immediate vicinity of that antenna without changing the impedance of the antenna and without substantially changing its radiation pattern. If the screen 3 is placed too far from the antenna 1, the amount of energy it will absorb will be quite small, and it will, therefore, not shield the undesirable reflecting object 4 to the required extent. However, when the screen 3 is placed at an appropriate distance from the antenna as indicated in Figs. 3 and 4, the radiation pattern of the antenna 1 is such that any object beyond the screen 3 will receive a very small signal, especially when the screen is located directly between this object and the antenna 1. It will also be noticed that the change of the radiation pattern (dotted line, Fig. 6) on the side of the antenna away from the screen is of negligible extent. With such an arrangement, it is clear that a glide path which uses the portion of the radiation pattern of Fig. 6 from 180° around to 90° in a clockwise direction, will provide a normal and usable path. An object to the left of the glide path antenna 1 and particularly in a counter-clockwise direction will have practically no energy directed toward it which it could reflect. From Fig. 6, it can be seen that the useful screening effect of the absorption screen 3 is carried over an arc of at least plus and minus 30°. For most practical cases, this is sufficient screening; however, if more screening is desired, it is clear that the screen can be made larger without any substantial distortion of the desired glide path.

While I have described above the principles of my invention in connection with specific apparatus, it is to be clearly understood that this description is made only by way of example and not as a limitation to the scope of my invention.

What is claimed is:

1. An electromagnetic radiation screen, comprising a bank of spaced discrete conductors with the conductors arranged in successively spaced planes, the number of conductors in each plane being greater than the number of conductors in the preceding planes nearer the front of the screen.

2. An electromagnetic radiation screen, comprising a bank of spaced discrete conductors with the conductors arranged in spaced parallel groups and with the conductors in each group being parallel to each other, the number of conductors in each group being greater than the number of conductors in the preceding groups nearer the front of the screen.

3. An electromagnetic radiation screen, comprising a substantially wedge-shaped array of discrete wires arranged in successive spaced groups, the number of wires in successive groups increasing from the apex to the rear of the screen.

4. An electromagnetic radiation absorption screen, comprising a plurality of discrete wires mounted in spaced parallel planes with the number of wires in each plane being one greater than the number of wires in the next preceding plane nearer the front of the screen.

5. An electromagnetic radiation absorption screen, comprising a plurality of discrete wires arranged in spaced planes with the number of wires in each plane nearer the front of the screen being greater than the number of wires in the next preceding plane and in staggered relation thereto.

6. An electromagnetic radiation absorption screen according to claim 5 in which the screen is of wedge-shaped configuration with the apex of the wedge consisting of a single wire and with the successive planes of wires in staggered relation.

7. An electromagnetic radiation absorption screen, comprising a wire which tends to set up standing waves in front thereof when excited by an adjacent antenna, a pair of discrete wires mounted in spaced relation to said first wire for reducing said standing waves, additional sets of discrete wires each set being successively spaced a greater distance from said first wire to substantially entirely cancel the said standing waves in front of said first wire.

8. An electromagnetic radiation screen according to claim 2 in which the said parallel groups of conductors are spaced apart a distance approximating one-quarter wave length of the radiation which is incident upon the screen.

9. An electromagnetic radiation screen according to claim 2 in which the conductors in each group are spaced apart a distance less than one-half the wavelength of the frequency of the radiation incident upon the screen.

10. In combination, a radiation antenna for setting up a radiation glide path and means to maintain the pattern of said radiation notwithstanding the presence of undesired radiation reflecting objects, said means comprising a radiation absorption screen mounted between the antenna and the object and consisting of a series of discrete wires mounted in spaced planes, the planes remote from the antenna having a greater number of conductors than those closer to the antenna.

11. The combination according to claim 10 in which said screen is substantially wedge-shaped in configuration with the apex of the wedge adjacent the antenna and the wires in successive planes are staggered with relation to the wires in the adjacent planes.

12. An electromagnetic radiation screen comprising a bank of spaced discrete conductors arranged in successively spaced planes, the number of conductors in each plane being greater than the number of conductors in any of the preceding planes nearer the front of the screen and being spaced from the conductors in a preceding plane a distance such that radiated waves from the planes cancel one another.

13. An electromagnetic radiation screen comprising a bank of spaced discrete conductors arranged in successively spaced planes, the number of conductors in each plane being greater than the number of conductors in any of the preceding planes nearer the front of the screen, said planes being spaced from one another a distance such that radiation from one plane cancels with that from another.

SIDNEY B. PICKLES.

REFERENCES CITED

The following references are of record in the file of this patent:

UNITED STATES PATENTS

| Number | Name | Date |
|---|---|---|
| 1,745,342 | Yagi | Jan. 28, 1930 |
| 1,860,123 | Yagi | May 24, 1932 |
| 2,064,582 | Wolff | Dec. 15, 1936 |
| 2,142,648 | Linder | Jan. 3, 1939 |
| 2,436,578 | Korn et al. | Feb. 24, 1948 |

FOREIGN PATENTS

| Number | Country | Date |
|---|---|---|
| 668,231 | Germany | Nov. 28, 1938 |